(12) United States Patent
Versaevel et al.

(10) Patent No.: US 12,170,077 B2
(45) Date of Patent: Dec. 17, 2024

(54) ACOUSTIC ATTENUATION PANEL FOR LOW-FREQUENCY WAVES

(71) Applicant: Safran Nacelles, Gonfreville l'Orcher (FR)

(72) Inventors: Marc Versaevel, Moissy Cramayel (FR); Bertrand Desjoyeaux, Moissy Cramayel (FR); Mathieu Preau, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 330 days.

(21) Appl. No.: 17/716,089

(22) Filed: Apr. 8, 2022

(65) Prior Publication Data
US 2022/0230613 A1   Jul. 21, 2022

Related U.S. Application Data

(63) Continuation of application No. PCT/FR2020/051712, filed on Sep. 30, 2020.

(30) Foreign Application Priority Data

Oct. 8, 2019   (FR) .................................. 19/11130

(51) Int. Cl.
G10K 11/172 (2006.01)
B64D 33/02 (2006.01)

(52) U.S. Cl.
CPC ............ *G10K 11/172* (2013.01); *B64D 33/02* (2013.01); *B64D 2033/0206* (2013.01)

(58) Field of Classification Search
CPC .................. G10K 11/172; B64D 33/02; B64D 2033/0206
See application file for complete search history.

(56) References Cited

U.S. PATENT DOCUMENTS

| | | | | |
|---|---|---|---|---|
| 3,910,374 A | * | 10/1975 | Holehouse | ........... G10K 11/172 428/116 |
| 4,084,367 A | | 4/1978 | Saylor et al. | |
| 4,265,955 A | | 5/1981 | Harp et al. | |
| 6,509,081 B1 | | 1/2003 | Diamond | |

(Continued)

FOREIGN PATENT DOCUMENTS

| | | |
|---|---|---|
| GB | 2300081 | 10/1996 |
| WO | 2015023389 | 2/2015 |

OTHER PUBLICATIONS

International Search Report for corresponding International Application PCT/FR2020/051712, mailed Jan. 20, 2021.

*Primary Examiner* — Forrest M Phillips
(74) *Attorney, Agent, or Firm* — Burris Law, PLLC

(57) ABSTRACT

An acoustic attenuation panel includes a perforated acoustic wall, a first honeycomb structure coupled to the perforated acoustic wall and including a plurality of acoustic cells defined by peripheral partitions, a second honeycomb structure including a plurality of acoustic cells defined by peripheral partitions, and a septum which includes a plurality of macro-perforations and is positioned between the first honeycomb structure and the second honeycomb structure. Each acoustic cell of the first honeycomb structure and each acoustic cell of the at least second honeycomb structure are arranged opposite a single perforation of the septum.

14 Claims, 2 Drawing Sheets

(56) References Cited

U.S. PATENT DOCUMENTS

| | | | | |
|---|---|---|---|---|
| 8,820,477 | B1* | 9/2014 | Herrera | G10K 11/168 |
| | | | | 181/292 |
| 10,876,479 | B2* | 12/2020 | Roach | B32B 5/02 |
| 2010/0108435 | A1* | 5/2010 | Valleroy | G10K 11/172 |
| | | | | 29/525.01 |
| 2011/0290333 | A1* | 12/2011 | Desjoyeaux | B32B 38/0012 |
| | | | | 428/116 |
| 2013/0299274 | A1* | 11/2013 | Ayle | B64D 29/00 |
| | | | | 181/292 |
| 2014/0090923 | A1 | 4/2014 | Murray | |

* cited by examiner

Fig. 5
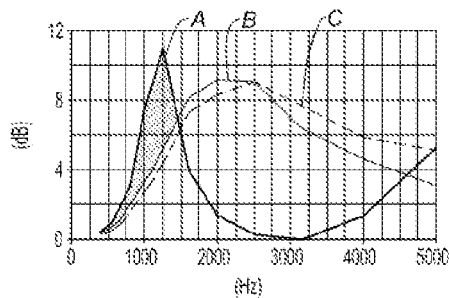
Fig. 6
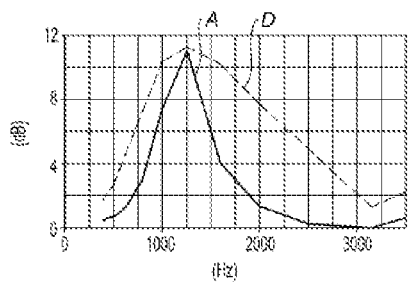
Fig. 7
| H1 (mm) | H2 (mm) | H₁ (mm) | Ø (mm) | L (mm) |
|---|---|---|---|---|
| 5 | 15 | 20 | 1.0 | 58 mm |
| 5 | 20 | 25 | 1.0 | 54 mm |
| 5 | 20 | 25 | 1.5 | 48 mm |
| 10 | 15 | 25 | 1.5 | 55 mm |
Fig. 8
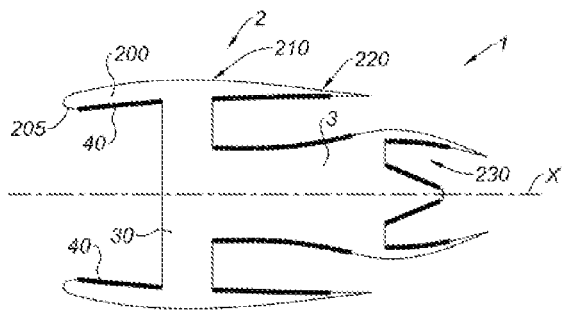

ACOUSTIC ATTENUATION PANEL FOR LOW-FREQUENCY WAVES

CROSS-REFERENCE TO RELATED APPLICATIONS

This application is a continuation of International Application No. PCT/FR2020/051712, filed on Sep. 30, 2020, which claims priority to and the benefit of FR 19/11130, filed on Oct. 8, 2019. The disclosures of the above applications are incorporated herein by reference in their entireties.

FIELD

The present disclosure relates to an acoustic attenuation panel for the treatment of low-frequency waves.

BACKGROUND

The statements in this section merely provide background information related to the present disclosure and may not constitute prior art.

An aircraft is propelled by one or more propulsion unit(s) each including a turbojet/turboprop engine housed in a tubular nacelle. Each propulsion unit is attached to the aircraft by a mast generally located under a wing or at the level of the fuselage.

A nacelle generally has a structure including an upstream section forming an air inlet upstream of the turbojet engine, a middle section configured to surround a fan of the turbojet engine, a downstream section configured to accommodate thrust reversal means and to surround the combustion chamber of the turbojet engine, and generally terminates in an exhaust nozzle the outlet of which is located downstream of the turbojet engine.

The air inlet is configured to improve the air intake which supplies the fan of the turbojet engine throughout the flight envelope and channels the air towards the fan.

The air inlet includes an air inlet lip forming a leading edge, attached to an annular structure.

The annular structure includes an outer fairing providing the outer aerodynamic continuity of the nacelle and an inner fairing providing the inner aerodynamic continuity of the nacelle, in particular with the outer fan casing at the level of the middle section. The air intake lip provides the upstream junction between these two fairings.

The inner fairing of the air inlet is exposed to a high flow of air and is located proximate to the blades of the fan. It therefore contributes to the transmission of the noise originating from the turbojet engine to the outside of the aircraft.

Also, it is known from the prior art to equip the inner fairing of the air inlet of the nacelle with an acoustic panel in order to attenuate the transmission of the noise generated by the turbojet engine.

Typically, the acoustic panel includes a perforated acoustic skin and a honeycomb core which is assembled on the acoustic skin.

The honeycomb core includes a plurality of acoustic cells, forming Helmholtz resonators, which are separated from each other by peripheral partitions.

The perforated skin is directed towards the noise emission area, so that the acoustic waves can penetrate through the openings of the perforated skin inside the acoustic cells. The acoustic energy is dissipated by visco-thermal effect in the acoustic cells.

In particular, acoustic panels are known the honeycomb core of which includes two levels of acoustic cells. These two levels of cells are separated from each other by a micro-perforated septum.

The presence of an additional level of acoustic cells allows improving the acoustic performance of the panel.

In recent years, the developments of propulsion systems have pursued the reduction of the consumption of aircrafts. To address this need, the overall evolution of aircrafts, in particular commercial aircrafts, tends to provide propulsion units having larger turbojet engine dimensions with larger diameter fans. It is also sought to provide shorter and lighter nacelles so as to reduce the generation of drag in the flight phase. The overall effect resulting in lower fuel consumption.

Due to the fan having larger dimensions, its rotational speed decreases and it then generates a lower frequency sonority. However, the acoustic panels of the prior art, which have improved acoustic treatment results in the medium or high frequencies, are not suitable for the acoustic treatment of low frequencies.

It is known in the public domain that the height of the cells allows adjusting the frequency at which the acoustic treatment is effective.

An increase in the dimensions of the cells also allows acoustic treatment in low frequencies.

An adaptation of the panels of the prior art would also consist in an increase in the height of cells of these panels. A target total height of the panel has, moreover, been evaluated to at least 50 mm to allow for an adequate low-frequency acoustic treatment.

However, the available space in future propulsion units with short nacelles does not allow integrating acoustic panels with excessive dimensions.

We know from the prior art, in particular from the applications WO2015023389 and GB2300081, low-frequency treatments with small bulk which consists in adding in each cell conical obstacles the top of which has an orifice.

However, this type of geometry is difficult to achieve on an industrial scale.

SUMMARY

This section provides a general summary of the disclosure and is not a comprehensive disclosure of its full scope or all of its features.

The acoustic attenuation panel according to the present disclosure finds an application in the aeronautics industry, in particular for the use thereof in the aircraft propulsion units.

The present disclosure addresses the above-referenced concerns and provides an acoustic attenuation panel including:
  a perforated acoustic wall,
  a first honeycomb structure connected to the perforated acoustic wall, having a plurality of acoustic cells delimited by peripheral partitions,
  a second honeycomb structure having a plurality of acoustic cells delimited by peripheral partitions,
  a septum having a plurality of macro-perforations, interposed between said first honeycomb structure and said second honeycomb structure, and
  each acoustic cell of the first honeycomb structure and each acoustic cell of said at least one second honeycomb structure being disposed opposite a unique perforation of the septum.

By macro-perforation, it should be understood perforations the diameter of which is greater than or equal to 1 mm.

According to variations of the present disclosure, the acoustic attenuation panel includes one or more of the following optional features considered alone or in all possible combinations:

Each perforation of the septum has a diameter between 1 mm and 2 mm.

Each acoustic cell of the first honeycomb structure has a height between 5 mm and 10 mm.

Each acoustic cell of the second honeycomb structure has a height between 10 mm and 20 mm.

The height of the acoustic cells of the first honeycomb structure is lower than the height of the acoustic cells of the second honeycomb structure.

The height of the acoustic cells of the first honeycomb structure is equal to the height of the acoustic cells of the second honeycomb structure.

The total height of the acoustic panel is less than 30 mm.

The macro-perforations are evenly distributed in the septum such that three adjacent macro-perforations form an equilateral triangle, one side of which is equal to the diameter of the acoustic cells of the honeycomb structures and one height of which is equal to 0.86 times the diameter of the acoustic cells of the honeycomb structures +/−20%.

The acoustic cells of the second honeycomb structure have a diameter larger than the diameter of the acoustic cells of the first honeycomb structure.

According to this variant, the macro-perforations are evenly distributed in the septum so that three adjacent macro-perforations form an equilateral triangle, one side of which is equal to the diameter of the acoustic cells of the second honeycomb structure and one height of which is equal to 0.86 times the diameter of the acoustic cells of the second honeycomb structure +/−20%.

The first honeycomb structure is superimposed on the second honeycomb structure such that the peripheral partitions of the cells of the first honeycomb structure are arranged in the geometric continuity of the peripheral partitions of the cells of the second honeycomb structure.

Each cell of the first honeycomb structure and each cell of the second honeycomb structure is centered with respect to the single perforation of the septum.

Another form of the present disclosure provides a nacelle in which a fan is disposed, the nacelle including an air inlet including an inner face directed opposite the fan, said inner face receiving at least one acoustic attenuation panel as described previously.

In an aspect, the nacelle includes an air inlet, a thrust reverser, and an exhaust nozzle, wherein at least one of the air inlet, the thrust reverser, and the exhaust nozzle receives an acoustic attenuation panel as described previously.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a graphical representation illustrating the difference in the treated frequency ranges between the acoustic panel according to the present disclosure and the acoustic panels of the prior art;

FIG. 6 is a graphical representation illustrating the equivalence of the acoustic attenuation results obtained with an acoustic panel according to the present disclosure and an acoustic panel with a total height of 50 mm;

FIG. 7 is a table listing the results obtained by varying various parameters of the acoustic panel according to the present disclosure; and FIG. 8 is an illustration of a propulsion unit including a nacelle the air inlet of which receives an acoustic attenuation panel according to the present disclosure.

Figure 1:
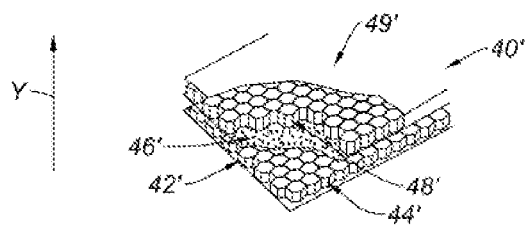
FIG. 1 is a schematic representation of an acoustic attenuation panel according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a partial view of an acoustic attenuation panel known from the prior art, in particular from the application FR 2841031.

In this example, the acoustic panel 40' comprises a double resonator, that is to say it comprises two thicknesses of acoustic cells and has a laminated structure including successively, along the direction of the Y axis, a perforated acoustic wall 42', a first honeycomb structure 44', a micro-perforated septum 46', a second honeycomb structure 48' and a solid skin 49' arranged on the second honeycomb structure 48'.

The perforated acoustic wall 42' is configured to be in contact with the circulating air and is crossed by a plurality of macro-perforations (not shown) through which the acoustic waves can penetrate.

Each of the first honeycomb structure 44' and of the second honeycomb structure 48' includes acoustic cells separated from each other by peripheral partitions.

The septum 46' is disposed between the first 44' and second 48' honeycomb structures. The micro-perforated septum of the current panels is crossed by a plurality of micro-perforations the diameter of which is conventionally in the range of 0.3 mm with a perforation density in the range of 400,000 to 800,000 holes/m2.

The acoustic panels with double resonators and with micro-perforated septum provide for attenuation of acoustic waves at medium and high frequencies, that is to say higher than 1,500 Hz.

Figure 2:
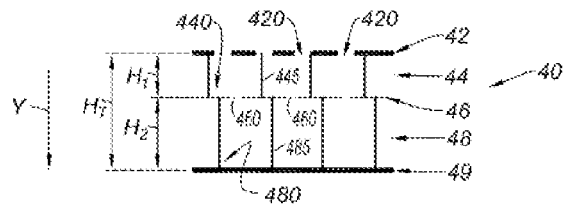
FIG. 2 is a schematic cross-sectional view of an acoustic panel according to one form of the present disclosure.

FIG. 2 is a schematic representation of a cross-section of an acoustic panel according to a first form of the present disclosure.

The acoustic attenuation panel 40 is an acoustic panel of the double resonator type including successively, along the direction of the Y axis, a perforated acoustic wall 42, a first honeycomb structure 44, a macro-perforated septum 46, a second honeycomb structure 48, and a solid wall 49 called reflective wall, devoid of perforation.

Indeed, the use of an acoustic panel with a unique honeycomb structure does not allow obtaining a sufficient open surface ratio for a desired acoustic treatment.

The perforated acoustic wall 42 comprises a plurality of macro-perforations 420 evenly formed in the acoustic wall 42. Each perforation 420 has a diameter in the range of 1.5 mm with a perforation density in the range from 40,000 to 100,000 holes/m2.

The perforated acoustic wall comprises an opening ratio between 8% and 20% relative to the total surface of the wall.

The first honeycomb structure 44 comprises a plurality of acoustic cells 440 delimited by peripheral partitions 445. The second honeycomb structure 48 comprises a plurality of acoustic cells 480 delimited by peripheral partitions 485.

The first honeycomb structure 44 is superimposed on the second honeycomb structure 48. The first honeycomb structure 44 is misaligned with respect to the second honeycomb structure 48, that is to say that the peripheral partitions 445 of the first honeycomb structure 44 are not in geometric continuity with the peripheral partitions 485 of the second honeycomb structure 48.

The first honeycomb structure is directly coupled to the perforated acoustic wall 42 by gluing, for example.

The second honeycomb structure is coupled to the solid wall 49 by gluing, for example.

The acoustic cells 440 of the first honeycomb structure 44 extend in the Y axis and have a height H1 between 5 and 10 mm. The height of the acoustic cells 440 of the first honeycomb structure 44 must be at least equal to 5 mm to inhibit coupling phenomena.

By height, it should be understood the side that separates the faces of a honeycomb structure.

The acoustic cells 480 of the second honeycomb structure 48 extend in the Y axis and have a height H2 between 10 and 20 mm.

The height H1 of the acoustic cells 440 of the first honeycomb structure 44 in direct contact with the perforated acoustic wall 42 is smaller than the height H2 of the acoustic cells 480 of the second honeycomb structure 48. The aim is to make the volume of the acoustic cells 480 of the second honeycomb structure 48 resonate.

In a form of the present disclosure not shown, the height of the acoustic cells 440 of the first honeycomb structure 44 is equal to the height of the acoustic cells 480 of the second honeycomb structure 48.

To reduce bulk, the total height HT of the acoustic attenuation panel 40 is less than or equal to 30 mm. In an aspect, the total height HT is less than 25 mm.

The total height of the panel takes into account all of the elements constituting said acoustic panel.

The first honeycomb structure 44 and the second honeycomb structure 48 are separated from each other by the septum 46. The septum 46 is interposed between said first honeycomb structure 44 and said second honeycomb structure 48. The septum 46 extends over the entire surface between the two honeycomb structures, in a direction perpendicular to the Y axis.

The septum 46 differs from that of the prior art in that it is not micro-perforated but macro-perforated, that is to say that it has a plurality of perforations 460 having a diameter greater than or equal to 1 mm. In an aspect, the diameter of the macro-perforations 460 of the septum 46 is between 1 and 2 mm.

Each acoustic cell 440 of the first honeycomb structure 44 and each acoustic cell 480 of said second honeycomb structure 48 is disposed opposite a unique perforation 460 of the septum 46. That is to say each acoustic cell is disposed opposite one single macro-perforation of the septum 46.

Figure 4:
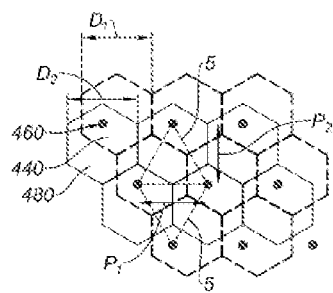
FIG. 4 is a top view of an acoustic panel according to a form of the present disclosure.

The principle is to define the drilling pattern of the septum, that is to say the distance between the macro-perforations so that in general, most of the surface of the septum has a unique perforation per acoustic cell in each honeycomb structure (FIG. 4). It should be noted that, during industrial production, edge effects may occur marginally according to which a peripheral partition of a honeycomb structure may be positioned at the level of a perforation. In these marginal cases, there will potentially be a half perforation per cell or a full perforation and a half perforation at one end of the cell. This does not call into question the effectiveness of the panel conferred thereon by the fact that most of the macro-perforations are arranged in a unique manner opposite each of the acoustic cells of the first honeycomb structure and of the second honeycomb structure.

As an unintended consequence of the present disclosure, the macro-perforations 460 of the septum 46 allow obtaining an acoustic attenuation behavior in low frequencies without an increase in the height of the acoustic cells. The macro-perforations 460 of the septum 46 allow forcing the entire volume of the second honeycomb structure 48 to resonate over its height H2, thus allowing for an improved acoustic treatment of low-frequency waves.

The septum 46 may, for example, be made of an organic composite comprising one to three layer(s) of fiberglass fabrics embedded in an epoxy resin hardened by polymerization.

Figure 3:
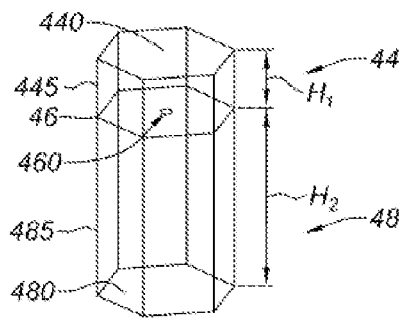
FIG. 3 is an enlarged view of superimposed cells of an acoustic panel according to a form of the present disclosure.

FIG. 3 is an enlarged view of a partial section of the acoustic panel according to another form of the present disclosure. Each acoustic cell has a hexagonal shape.

In this form, the first honeycomb structure 44 is superimposed on the second honeycomb structure 48 such that the peripheral partitions 445 of the cells of the first honeycomb structure are arranged in the geometric continuity of the peripheral partitions 445 of the cells of the second honeycomb structure 48.

Each acoustic cell 440 of the first honeycomb structure 44 is arranged opposite an acoustic cell 480 of the second honeycomb structure 48.

The septum 46 is provided between the acoustic cell 440 of the first honeycomb structure 44 and the acoustic cell 480 of the second honeycomb structure 48.

The septum comprises a unique circular macro-perforation 460 disposed opposite the acoustic cell 440 of the first honeycomb structure 44 and the acoustic cell 480 of the second honeycomb structure 48. Thus, each acoustic cell 440 of the first honeycomb structure 44 and each cell 480 of the second honeycomb structure are centered with respect to the unique perforation 460 of the septum 46.

In the present example, the height H1 of the acoustic cell 440 of the first honeycomb structure 44 is smaller than the height H2 of the acoustic cell 480 of the second honeycomb structure 48.

FIG. 4 is a partial view of a longitudinal section of the acoustic attenuation panel according to a further form of the present disclosure.

FIG. 4 illustrates the definition of the drilling pattern of the septum 46, that is to say the definition of the distance between each of the macro-perforations 460 in the septum 46.

The definition of the drilling pattern is defined so as to obtain a unique macro-perforation 460 opposite each acoustic cell of each honeycomb structure.

This figure illustrates the first honeycomb structure 44 comprising the plurality of acoustic cells 440 in the foreground, the second honeycomb structure 48 comprising the plurality of acoustic cells 480 in the background, as well as the macro-perforations 460 of the septum disposed between the first honeycomb structure 44 and the second honeycomb structure 48.

In the present example, the diameter D1 of the acoustic cells 440 of the first honeycomb structure 44 is equal to the diameter D2 of the acoustic cells 480 of the second honeycomb structure 48.

To obtain a unique macro-perforation 460 opposite each of the acoustic cells 440, 480, the drilling step in the septum 46 must be in the range of the diameter D1, D2 of the acoustic cells 440, 480 while taking into account the tolerances. The diameter D1, D2 is defined as being the diameter of the circle inscribed in the hexagon of an acoustic cell.

The drilling step P1 of the septum 46 in the length of the panel is defined by the general rule: D+/−20%. With D corresponding to the diameter D1, D2 of the acoustic cells 440, 480.

The drilling step P2 of the septum 46 in the width of the panel is defined by the general rule: (D×0.86)+/−20%. With D corresponding to the diameter D1, D2 of the acoustic cells 440, 480.

Thus, the macro-perforations 460 are evenly distributed in the septum such that three adjacent macro-perforations 460 form an equilateral triangle 5, one side P1 of which is equal to the diameter D1, D2 of the acoustic cells 440, 480 of the first honeycomb structure 44 and of the second honeycomb structure 48, and one height P2 of which is equal to 0.86 times the diameter D1, D2 of the acoustic cells 440, 480 of the first honeycomb structure 44 and of the second honeycomb structure 48 +/−20%.

Thus, for example, by using honeycomb structures with ⅜" dimensions known to those skilled in the art, for which the acoustic cells have a diameter D1, D2 equal to 9.52 mm, the drilling step P1 of the septum 46 in the length is set to 9.5 mm and the drilling step P2 of the septum in the width of the acoustic panel is set to 8.3 mm.

This allows obtaining a unique perforation 460 of the septum 46 opposite each acoustic cell 440, 480 of the honeycomb structures such that the acoustic attenuation is improved.

The present disclosure is not limited to these types of honeycomb structures, and thus honeycomb structures with larger or smaller dimensions may be employed while remaining within the teachings herein.

In yet another form of the present disclosure not shown, the diameter D2 of the acoustic cells 480 of the second honeycomb structure 48 is larger than the diameter D1 of the acoustic cells 440 of the first honeycomb structure 44. This form provides for an improved volume effect and obtaining equivalent acoustic attenuation results by reducing the height H2 of the acoustic cells of the second honeycomb structure 48 and therefore a greater gain in size.

In this form, the drilling step is defined according to the diameter D2 of the acoustic cells 480 of the second honeycomb structure 48, that is to say according to the largest diameter of the cells.

Thus, the macro-perforations 460 are evenly distributed in the septum such that three adjacent macro-perforations 460 form an equilateral triangle 5, one side P1 of which is equal to the diameter of the acoustic cells 480 of the second honeycomb structure 48, and one height P2 of which is equal to 0.86 times the diameter of the acoustic cells 480 of the second honeycomb structure 48 +/−20%.

FIG. 5 is a comparative graph of the acoustic attenuation results obtained between the acoustic panel according to the present disclosure and the acoustic panels of the prior art.

The curve A illustrates the acoustic attenuation result obtained with the acoustic attenuation panel according to the present disclosure in which the height H1 of the acoustic cells 440 of the first honeycomb structure 44 is equal to 5 mm, the height H2 of the acoustic cells 480 of the second honeycomb structure 48 is equal to 15 mm, and the diameter of the macro-perforations 460 of the septum 46 is equal to 1 mm.

The curve B illustrates the acoustic attenuation result obtained with an acoustic panel of the prior art having a unique honeycomb structure called "Single Degree of Freedom" and having a total height of 20 mm.

The curve C illustrates the acoustic attenuation result obtained with an acoustic panel of the prior art having two honeycomb structures separated by a micro-perforated septum called "Double Degree of Freedom" and having a total height of 20 mm.

As the graph illustrates, the acoustic panels of the prior art provide satisfactory acoustic treatments in the medium at high frequencies. In addition, the so-called "Double Degree of Freedom" panels with micro-perforated septum allow widening of the acoustic attenuation to high frequencies compared to a so-called "Single Degree of Freedom" panel of the same total height.

In turn, the acoustic panel according to the present disclosure allows achieving an acoustic attenuation of the characteristic low-frequency waves of new propulsion units, for the same bulk.

FIG. 6 is a graphical representation that illustrates the acoustic attenuation results obtained with an acoustic panel according to the present disclosure and an acoustic panel having a total height of 50 mm.

The curve A represents the acoustic attenuation obtained with an acoustic panel according to the present disclosure wherein the acoustic cells 440 of the first honeycomb structure 44 have a height H1 equal to 5 mm, the acoustic cells 480 of the second honeycomb structure 48 have a height H2 equal to 15 mm, and the macro-perforations 460 of the septum 46 have a diameter of 1 mm.

The curve D represents the acoustic attenuation obtained with an acoustic panel having a unique honeycomb structure called "Single Degree of Freedom" and the total height of which is 50 mm.

The curve D illustrates the theory that the increase in the dimensions of the cells provides for the treatment of the waves in low frequencies.

The curve A demonstrates that the acoustic panel according to the present disclosure allows obtaining a desired acoustic attenuation of low-frequency waves with a gain of size of 60% compared to the acoustic panel of total height equal to 50 mm.

The acoustic attenuation panel according to the present disclosure allows obtaining an improved acoustic treatment of the low-frequency waves over a more selective frequency range.

FIG. 7 is a table that illustrates the acoustic length equivalence obtained with the acoustic panels according to the present disclosure for which different parameters have been varied.

The tested parameters include the height H1 of the acoustic cells 440 of the first honeycomb structure, the height H2 of the acoustic cells 480 of the second honeycomb structure, and the diameter of the macro-perforations 460 of the septum 46.

The columns present, from left to right: the height H1 of the acoustic cells 440 of the first honeycomb structure 44, the height H2 of the acoustic cells 480 of the second honeycomb structure 48, the total height of the acoustic attenuation panel according to the present disclosure, the diameter of the macro-perforation of the septum 46, and the equivalence of the wavelength.

The parameters of the height H1 of the acoustic cells of the first honeycomb structure have been tested between 5 and 10 mm. The parameters of the height H2 of the acoustic cells of the second honeycomb structure have been tested between 15 and 20 mm such that the total height of the acoustic panels of the present disclosure is always less than 30 mm. The diameter of the macro-perforation of the septum 46 has been tested between 1 and 1.5 mm.

The results demonstrate the obtainment of acoustic lengths equivalent to those obtained with acoustic panels having a total height in the range of 50 mm. The acoustic panels according to the present disclosure allow obtaining acoustic lengths significantly larger than the total height thereof.

To reduce bulk as much as possible, the height H2 of the acoustic cells 480 of the second honeycomb structure 48 as well as the diameter of the macro-perforation are chosen according to the targeted frequency then the height H1 of the acoustic cells 440 of the first honeycomb structure 44 is reduced as much as possible.

FIG. 8 is an illustration of a propulsion unit 1 extending according to a longitudinal axis X comprising a short nacelle 2 and a turbojet engine 3. The nacelle 2 has a structure comprising an upstream section forming an air inlet 200, a middle section 210 comprising fan cowls configured to surround a fan 30 of the turbojet engine 3, a downstream section 220 comprising a thrust reverser and configured to surround the combustion chamber of the turbojet engine and an exhaust nozzle 230.

The air inlet 200 comprises an inner face 205 directed opposite the fan 30, said internal face receives at least one acoustic attenuation panel according to the present disclosure.

As illustrated in FIG. 8, other components of the nacelle such as the thrust reverser, for example, can receive the acoustic attenuation panel according to the present disclosure.

As a result, the acoustic panel according to the present disclosure provides a low-frequency acoustic treatment with acoustic performance equivalent to the acoustic treatment obtained with acoustic panels of total height in the range of 50 mm, with a gain of size in the range of 60% in comparison with these.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An acoustic attenuation panel comprising:
   a perforated acoustic wall;
   a first honeycomb structure coupled to the perforated acoustic wall, the first honeycomb structure comprising a plurality of acoustic cells delimited by peripheral partitions;
   a second honeycomb structure comprising a plurality of acoustic cells delimited by peripheral partitions; and
   a septum comprising a plurality of macro-perforations interposed between said first honeycomb structure and said second honeycomb structure,
   each acoustic cell of the first honeycomb structure and each acoustic cell of said second honeycomb structure being disposed opposite a unique perforation of the septum,
   wherein the macro-perforations are evenly distributed in the septum such that three adjacent macro-perforations form an equilateral triangle one side of which is equal to a diameter of the acoustic cells of the first and second honeycomb structures, and one height of which is equal to 0.86 times the diameter of the acoustic cells of the first and second honeycomb structures +/−20%.

2. The acoustic attenuation panel according to claim 1, wherein each of the plurality of macro-perforations of the septum has a diameter between 1 mm and 2 mm.

3. The acoustic attenuation panel according to claim 1, wherein each of the plurality of acoustic cells of the first honeycomb structure has a height between 5 mm and 10 mm.

4. The acoustic attenuation panel according to claim 1, wherein each of the plurality of acoustic cells of the second honeycomb structure has a height between 10 mm and 20 mm.

5. The acoustic attenuation panel according to claim 1, wherein the height of the acoustic cells of the first honeycomb structure is smaller than the height of the acoustic cells of the second honeycomb structure.

6. The acoustic attenuation panel according to claim 1, wherein the height of the acoustic cells of the first honeycomb structure is equal to the height of the acoustic cells of the second honeycomb structure.

7. The acoustic attenuation panel according to claim 1, wherein the acoustic attenuation panel has a total height of less than 30 mm.

8. The acoustic attenuation panel according to claim 1, wherein the acoustic cells of the second honeycomb structure have a diameter larger than the diameter of the acoustic cells of the first honeycomb structure.

9. The acoustic attenuation panel according to claim 8, wherein the macro-perforations are evenly distributed in the septum such that three adjacent macro-perforations form an equilateral triangle one side of which is equal to the diameter of the acoustic cells of the second honeycomb structure, and one height of which is equal to 0.86 times the diameter of the acoustic cells of the second honeycomb structure +/−20%.

10. The acoustic attenuation panel according to claim 1, wherein the first honeycomb structure is superimposed on the second honeycomb structure such that the peripheral partitions of the cells of the first honeycomb structure are arranged in a geometric continuity of the peripheral partitions of the cells of the second honeycomb structure.

11. The acoustic attenuation panel according to claim 10, wherein each cell of the first honeycomb structure and each cell of the second honeycomb structure is centered with respect to the unique perforation of the septum.

12. A nacelle wherein a fan is disposed, the nacelle comprising an air inlet comprising an internal face directed opposite the fan, said internal face receiving at least one acoustic attenuation panel according to claim 1.

13. The nacelle according to claim 12, wherein the nacelle comprises an air inlet, a thrust reverser, and an exhaust nozzle, wherein at least one of the air inlet, the thrust reverser, and the exhaust nozzle receives the acoustic attenuation panel.

14. An acoustic attenuation panel comprising:
 a perforated acoustic wall;
 a first honeycomb structure coupled to the perforated acoustic wall, the first honeycomb structure comprising a plurality of acoustic cells delimited by peripheral partitions;
 a second honeycomb structure comprising a plurality of acoustic cells delimited by peripheral partitions; and
 a septum comprising a plurality of macro-perforations interposed between said first honeycomb structure and said second honeycomb structure,
 each acoustic cell of the first honeycomb structure and each acoustic cell of said second honeycomb structure being disposed opposite a unique perforation of the septum,
 wherein the macro-perforations are evenly distributed in the septum such that three adjacent macro-perforations form an equilateral triangle one side of which is equal to a diameter of the acoustic cells of the first and second honeycomb structures, and one height of which is equal to 0.86 times the diameter of the acoustic cells of the first and second honeycomb structures +/−20%, and the diameter of the acoustic cells of each of the first and second honeycomb structures is equal.

* * * * *